March 6, 1928.  1,661,692

H. EVERIST

ROTARY CUTTER

Filed May 18, 1927

Inventor
Hubert Everist,
By
Attorney

Patented Mar. 6, 1928.

1,661,692

UNITED STATES PATENT OFFICE.

HUBERT EVERIST, OF SIOUX CITY, IOWA.

ROTARY CUTTER.

Application filed May 18, 1927. Serial No. 192,394.

The invention relates to improvements in rotary cutters.

The object of the present invention is to improve the construction of rotary cutters and to provide a simple, practical and efficient rotary cutter designed primarily for use in subgrading machines and adapted to be effectively employed in a group or series on a diagonally arranged rotary cutting member and equipped with cutting teeth adapted to be readily removed and reversed, whereby the teeth will be self-sharpening and may be readily replaced when worn out.

A further object of the invention is to provide a rotary cutter adapted to continuously throw the cut material forwardly and cause the cut material to tail out in a fine condition at the rear end of the diagonally arranged rotary cutting member and thereby avoid the spreading of such loose material over the entire subgrade and enabling the loose material to be removed or otherwise handled at a minimum cost.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims may be resorted to without departing from the spirit of the invention or sacrificing any of the advantages thereof.

Figure 1:
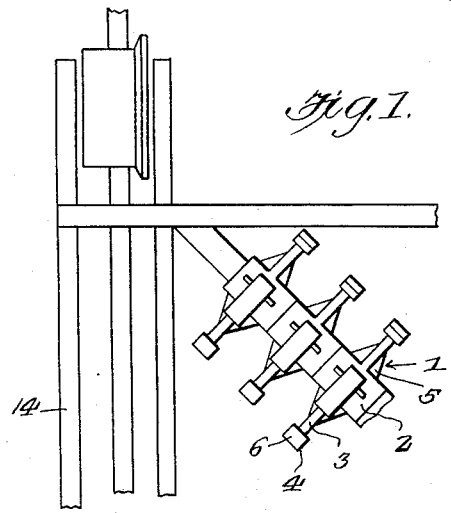
Figure 1 is a plan view of a portion of a subgrader provided with a diagonally arranged rotary cutting member composed of rotary cutters constructed in accordance with this invention.
Figure 4:
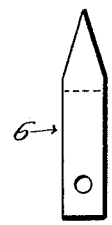
Figs. 4 and 5 are detail views of the cutting teeth.
Figure 5:
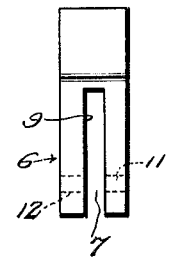
Figure 3:
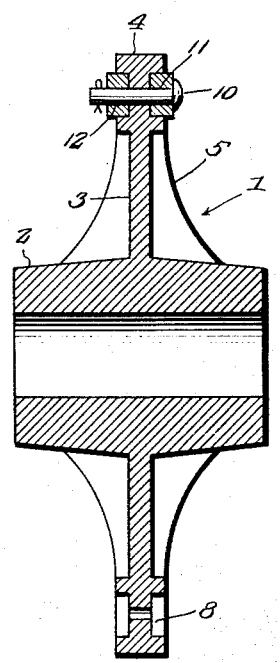
Fig. 3 is a transverse sectional view of the same.
Figure 2:
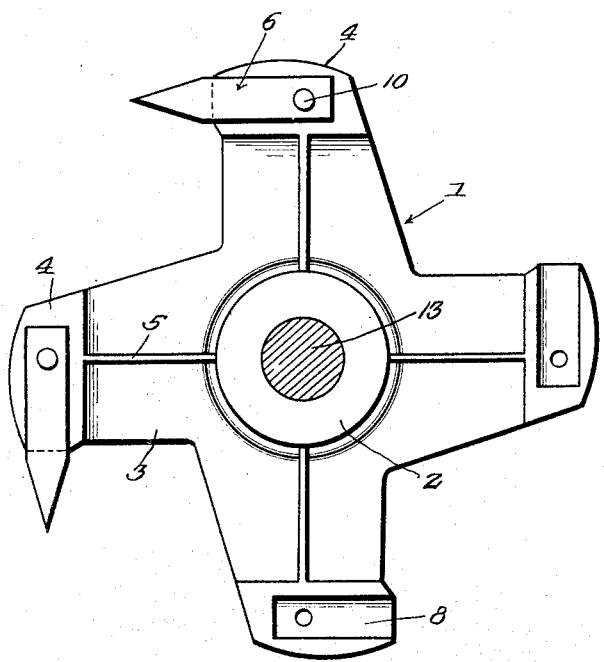
Fig. 2 is a side elevation of one of the rotary cutters, two of the arms being provided with teeth and the teeth of the other two arms being removed.

In the accompanying drawing, in which is illustrated the preferred embodiment of the invention, 1 designates a rotary cutter constructed of suitable metal and consisting of a central hub 2 and diametrically disposed arms 3 extending radially from the hub and provided at their outer ends with heads 4 formed by thickening the arms 3. The arms 3 are reinforced at opposite sides by webs 5 extending longitudinally of the arms from the hub 2 to the heads 4 and preferably tapered outwardly, as clearly shown in Fig. 3 of the drawing.

The arms are provided with cutting teeth 6 having bifurcated inner portions forming a slot 7 extending longitudinally of the inner portion of each tooth which straddles the head to which it is applied, and each head is provided at opposite sides with transverse recesses 8, extending inwardly from one side edge of the arm and terminating short of the opposite side edge thereof. The outer projecting portion of the cutting tooth is tapered and the inner portion is rectangular in cross section, and the recesses 8 are also rectangular in cross section and present flat bottom faces to the sides 9 of the fork or bifurcation of the tooth, and square shoulders or side walls which support and brace the inner attaching portion of the tooth. The tooth is secured in the recesses of the head by a transversely disposed pin 10 passing through registering openings 11 and 12 in the sides 9 and the head 4. The pin is sufficiently loose to enable it to be readily knocked out when it is desired to remove or reverse the tooth. The tapered projecting cutting portion of the tooth extends in the direction of the rotation of the cutter, and as the rotary cutter in practice is set at an angle owing to the diagonal disposition of the cutting element anywhere on one side of the tooth, may be compensated for by reversing the tooth from time to time, and when a tooth becomes too worn for effective work it may be readily removed and replaced by a new tooth without removing the cutter from the shaft 13 on which the cutters are mounted. The rotary cutting element is disposed diagonally with relation to the frame of the carriage 14 of the subgrader and is mounted in suitable bearings and while the rotary cutter with its reversible tooth is shown applied to a subgrader, it will be apparent that it may be employed for various other cutting operations where a cutter having reversible teeth is necessary or desirable.

The enlarged outer portions or heads of the radially extending arms form solid integral frames around the sides of the inner attaching portion of each tooth, and brace and support the same and relieve the transverse fastening devices of strain, so that there is no serious strain or stress upon the fastening devices. The comparatively loose pin which is readily knocked out when it is desired to remove or reverse a tooth is advantageous for the reason that cutters working in the dirt become corroded and rusty, so that practically any ordinary method of fastening would become useless in practice, and as the approximately U-shaped integral frame formed by recessing the sides of the head supports the tooth and relieves the same of all strain and stress, a substantially loose pin may be employed and there will be no liability of the pin accidentally falling out and the tooth becoming detached.

What I claim is:

1. A cutter of the class described comprising a head provided at opposite sides with transverse recesses extending inwardly from one side edge of the head and terminating short of the opposite side, forming integral approximately U-shaped frames located at opposite sides of the head and disposed substantially at right angles to a diameter of the cutter within the outer periphery thereof, a straight tooth having a projecting cutting portion and provided with an inner bifurcated attaching portion straddling the recessed portion of the head and having sides fitting the recesses of the head and supported and braced by the walls thereof, and means for retaining the tooth in the recesses of the head.

2. A cutter of the class described comprising a head provided at opposite sides with transverse recesses extending inwardly from one side edge of the head and terminating short of the opposite side, forming integral approximately U-shaped frames located at opposite sides of the head and disposed substantially at right angles to a diameter of the cutter within the outer periphery thereof, a tooth having a projecting cutting portion and provided with an inner bifurcated attaching portion straddling the recessed portion of the head and having sides fitting the recesses of the head and supported and braced by the walls thereof, and a relatively loose transverse pin passing through the sides of the attaching portion of the tooth and the head.

3. A rotary cutter of the class described provided with radially projecting arms having heads at their outer ends, said heads being recessed at opposite sides forming an integral frame, and straight cutting teeth disposed substantially at right angles to the said arms and located within the outer periphery of the cutter consisting of projecting cutting portions and inner bifurcated attaching portions straddling the recessed heads and having sides secured in the said recesses and braced and supported by the walls thereof.

4. A rotary cutter of the class described comprising a hub and radially projecting arms having heads at their outer ends and provided at opposite sides with webs extending from the heads to the hub, said heads being provided at opposite sides with transverse recesses extending inwardly from the said side edge of each arm, and straight cutting teeth projecting forwardly from the heads substantially at right angles to the radial arms and within the outer periphery of the cutter and having bifurcated inner attaching portions straddling the recessed heads and having sides fitting the recesses of the heads and supported by the walls thereof, and relatively loose transverse pins passing through the sides of the teeth and the recessed portions of the heads.

In testimony whereof I have hereunto set my hand.

HUBERT EVERIST.